(12) United States Patent
Shimoda et al.

(10) Patent No.: US 11,668,401 B2
(45) Date of Patent: Jun. 6, 2023

(54) DUAL GATE VALVE

(71) Applicant: SMC CORPORATION, Tokyo (JP)

(72) Inventors: Hiromi Shimoda, Tsukubamirai (JP); Hiroshi Ogawa, Tsukubamirai (JP); Takashi Nagao, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/644,161

(22) Filed: Dec. 14, 2021

(65) Prior Publication Data

US 2022/0196156 A1   Jun. 23, 2022

(30) Foreign Application Priority Data

Dec. 22, 2020 (JP) .............................. JP2020-212602

(51) Int. Cl.
*F16K 3/02* (2006.01)
*F16K 3/18* (2006.01)
(Continued)

(52) U.S. Cl.
CPC ............ *F16K 3/0272* (2013.01); *F16K 3/029* (2013.01); *F16K 3/18* (2013.01); *F16K 3/314* (2013.01);
(Continued)

(58) Field of Classification Search
CPC .................. F16K 7/16; F16K 99/0015; F16K 2099/0084; B01J 19/0093;
(Continued)

(56) References Cited

U.S. PATENT DOCUMENTS 6,427,973 B1 * 8/2002 Wagner .................. F16K 3/188
251/193
6,899,316 B2 * 5/2005 Duelli ..................... F16K 3/188
251/158
(Continued)

FOREIGN PATENT DOCUMENTS

JP         2010-121682 A    6/2010
JP         2015-509577 A    3/2015
WO    WO 2013-124616 A2   8/2013

OTHER PUBLICATIONS

Japanese Office Action dated Dec. 14, 2021 in Japanese Patent Application No. 2020-212602 (with English translation), citing document AO therein, 8 pages.
(Continued)

*Primary Examiner* — John Bastianelli
(74) *Attorney, Agent, or Firm* — Oblon, McClelland, Maier & Neustadt, L.L.P.

(57) ABSTRACT

A dual gate valve includes two valve plates that open and close two openings of a valve box, a support bar that supports the two valve plates, a valve rod connected to the support bar, and an operation unit that performs an open and close operation of the two valve plates via the valve rod. The support bar and the valve plate linearly and elongatedly extend in a lateral direction perpendicular to a central axis of the valve rod. The valve rod is connected to a central portion in the long direction of the support bar, and one and the other of the two valve plates are tiltably attached to one end and the other end in the long direction of the support bar via elastic members, respectively.

11 Claims, 12 Drawing Sheets (51) Int. Cl.
*F16K 3/314* (2006.01)
*F16K 51/02* (2006.01)

(52) U.S. Cl.
CPC ........ *F16K 51/02* (2013.01); *F16K 2200/101* (2021.08)

(58) Field of Classification Search
CPC ....... B01L 3/502738; B01L 2300/0816; B01L 2300/123; B01L 2400/0644; B01L 2400/0655; G01N 37/00; Y10T 137/87692
USPC ....................................................... 251/326
See application file for complete search history.

(56) References Cited

U.S. PATENT DOCUMENTS

| | | | | |
|---|---|---|---|---|
| 7,611,122 B2* | 11/2009 | Tichy | .................... | F16K 31/122 251/193 |
| 8,448,918 B2* | 5/2013 | Wagner | .................... | F16K 3/182 251/300 |
| 8,678,344 B2 | 3/2014 | Ehrne et al. | | |
| 8,827,241 B2* | 9/2014 | Geiser | .................... | F16K 3/188 251/193 |
| 9,995,402 B2 | 6/2018 | Kim et al. | | |
| 2004/0079915 A1* | 4/2004 | Contin | .................... | F16K 3/18 251/167 |
| 2006/0225811 A1* | 10/2006 | Sheydayi | ................ | F16K 51/02 141/98 |
| 2015/0034188 A1* | 2/2015 | Howes | .................. | F16K 3/0209 137/561 R |
| 2018/0045333 A1 | 2/2018 | Ehrne et al. | | |

OTHER PUBLICATIONS

Extended European Search Report dated Jun. 7, 2022 in European Patent Application No. 21213049.6, citing references AA-AC therein, 8 pages.

* cited by examiner

DUAL GATE VALVE

TECHNICAL FIELD

The present invention relates to a dual gate valve that opens and closes two openings of a valve box by using two valve plates.

BACKGROUND ART

In semiconductor processing equipment, a gate valve is used to open and close a gate formed in a vacuum chamber.

As disclosed in, for example, Patent Literature (PTL) 1, in the gate valve, a valve plate is attached to the front end of a valve rod to be operated by an operation unit, the valve plate is housed in the valve box, and the valve box is housed in the vacuum chamber. The valve plate opens and closes an opening that is formed in a side wall of the valve box so as to communicate with the gate.

Note that in the semiconductor processing equipment, the vacuum chamber may be provided with two gates. In such a case, the two gate valves are normally used. However, the use of two gate valves not only increases the cost but also sometimes causes difficulty to attach the two gate valves side by side, depending on the distance between the two gates.

Accordingly, a configuration can be employed in which two valve plates are attached to a valve rod of one of the gate valves, and the two valve plates open and close the two gates of the vacuum chamber, that is, the two openings formed in the valve box, at the same time.

However, in such a configuration, if the distance between the two gates is long, the distance between the two openings formed in the valve box is also long accordingly. For this reason, it is difficult to evenly open and close the two openings by the two valve plates.

CITATION LIST

Patent Literature

PTL 1: Japanese Unexamined Patent Application Publication No. 2010-121682

SUMMARY OF INVENTION

Technical Problem

A technical problem of the present invention is to provide a gate valve capable of opening and closing two openings of a valve box simultaneously and evenly by two valve plates.

Solution to Problem

To solve the above-described problem, according to the present invention, a dual gate valve is provided that includes two valve plates that open and close two openings of a valve box, a support bar that supports the two valve plates, a valve rod connected to the support bar, and an operation unit that performs an open and close operation of the two valve plates via the valve rod. The support bar and the valve plate linearly and elongatedly extend in a lateral direction perpendicular to a central axis of the valve rod. The valve rod is connected to the central portion in the long direction of the support bar, and one and the other of the two valve plates are tiltably attached to one end and the other end in the long direction of the support bar via elastic members, respectively.

According to the present invention, the elastic member may have a first side wall and a second side wall parallel to each other and a bent portion that connects one end in a horizontal width direction of the first side wall to one end in the horizontal width direction of the second side wall. The elastic member may be disposed such that a convex surface of the bent portion faces the outer side of the support bar in the longitudinal direction. The first side wall may be connected to a central portion of the back surface of the valve plate, and the second side wall may be connected to an end portion of the front surface of the support bar.

In this case, it is desirable that the first side wall of the elastic member be connected to a back surface of the valve plate using a plurality of first screws screwed from the side adjacent to the second side wall into first screw holes of the valve plate through screw insertion holes of the first side wall, and a plurality of second notch portions into which a tool used at the time of screwing the first screws is fitted be formed in the second side wall at positions facing the first screws. In addition, it is desirable that the second side wall of the elastic member be connected to a front surface of the support bar using a plurality of second screws screwed from the side adjacent to the first side wall into second screw holes of the support bar through screw insertion holes of the second side wall, and a plurality of first notch portions into which a tool used at the time of screwing the second screws is fitted be formed in the first side wall at positions facing the second screws.

Alternatively, the second side wall of the elastic member may be connected to the front surface of the support bar using a plurality of second screws screwed from the side adjacent the back surface of the support bar into second screw holes of the second side wall through screw insertion holes of the support bar.

Further, according to the present invention, it is desirable that at least one first positioning pin be provided on one of the first side wall of the elastic member and the valve plate, at least one first positioning groove be provided on the other, and the first positioning pin be fitted into the first positioning groove so that positioning of the elastic members and the valve plate is achieved, and it is desirable that at least one second positioning pin be provided on one of the second side wall of the elastic member and the support bar, at least one second positioning groove be provided on the other, and the second positioning pin be fitted into the second positioning groove so that positioning of the elastic member and the support bar is achieved.

In this case, the first positioning pin may be provided at a position close to an upper edge portion of the back surface of the valve plate, and the first positioning groove may consist of a vertical groove cut in the first side wall from the upper edge downward to a certain depth. Alternatively, the first positioning pin may be provided at a position close to the lower edge of the first side wall, and the first positioning groove may consist of a vertical groove cut in the valve plate from the lower edge upward to a certain depth.

In contrast, the second positioning pin may be provided at one of a middle position in the height direction of the second side wall and a middle position in the vertical direction of the front surface of the support bar, and the second positioning groove may consist of a lateral groove cut at one of a middle position in the vertical direction of the front surface of the support bar and a middle position in the height direction of the second side wall, from one of a side edge portion of the support bar and a side edge portion of the second side wall into a certain depth in the lateral direction.

In addition, according to the present invention, it is desirable that the valve rod be connected to the front surface of the support bar.

Furthermore, it is desirable that the height of the elastic member be equal to or less than a vertical width of the valve plate, and a vertical width of the support bar be equal to or less than the vertical width of the valve plate.

Advantageous Effects of Invention

According to the present invention, a support bar is attached to the tip of the valve rod, and one and the other of two valve plates are tiltably attached to one end and the other end of the support bar via the elastic members, respectively. In this way, even if the support bar is slightly curved due to the operation force applied from the valve rod and, thus, a pressing force of the support bar acts on the elastic member at an angle, the elastic member elastically deformed, and it is prevented that the pressing force acts on the valve plate at an angle. As a result, the entire valve plate is evenly pressed against a valve seat.

DESCRIPTION OF EMBODIMENTS

Figure 1:
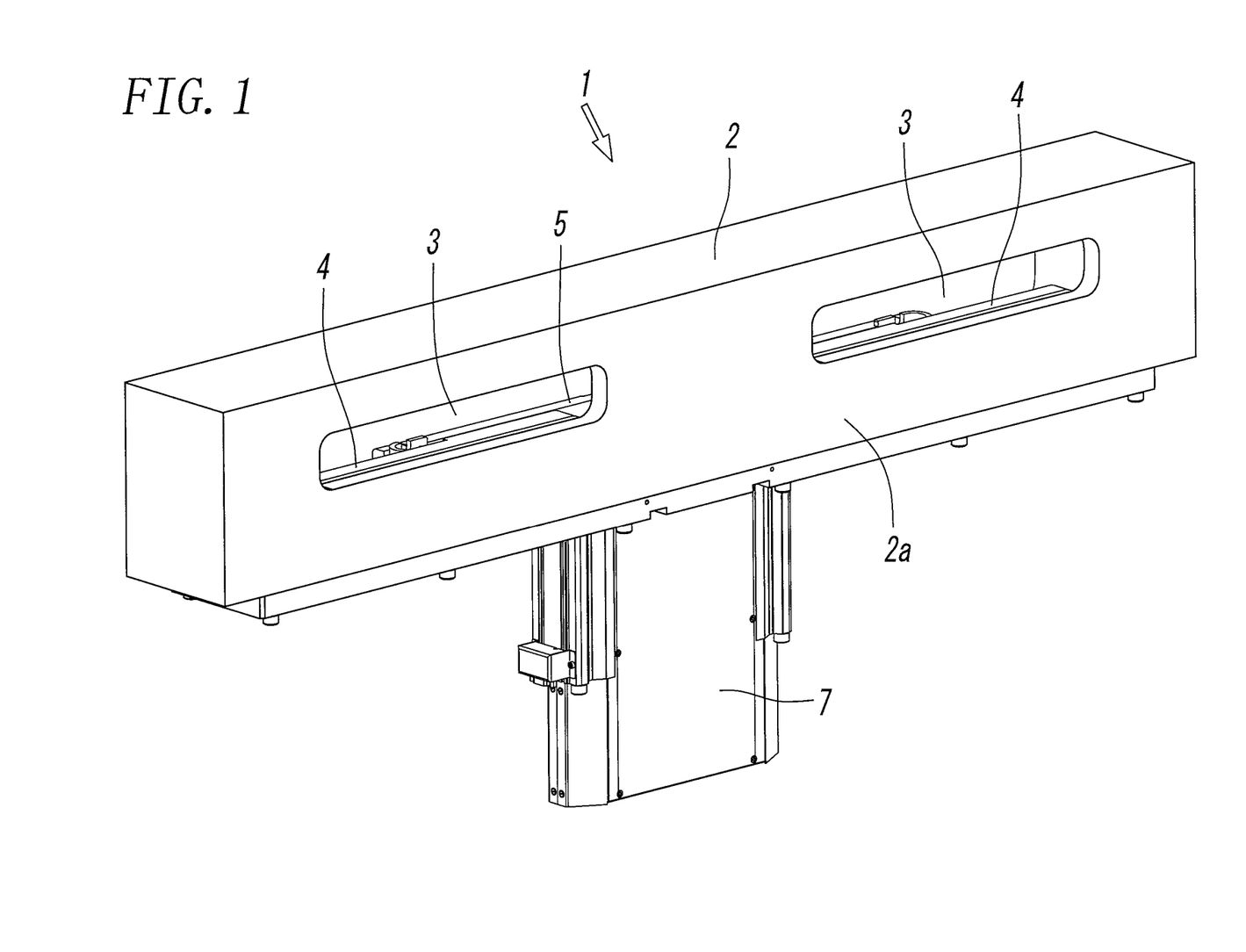
FIG. 1 is a perspective view of a gate valve according to a first embodiment as viewed from diagonally above and in front.
Figure 2:
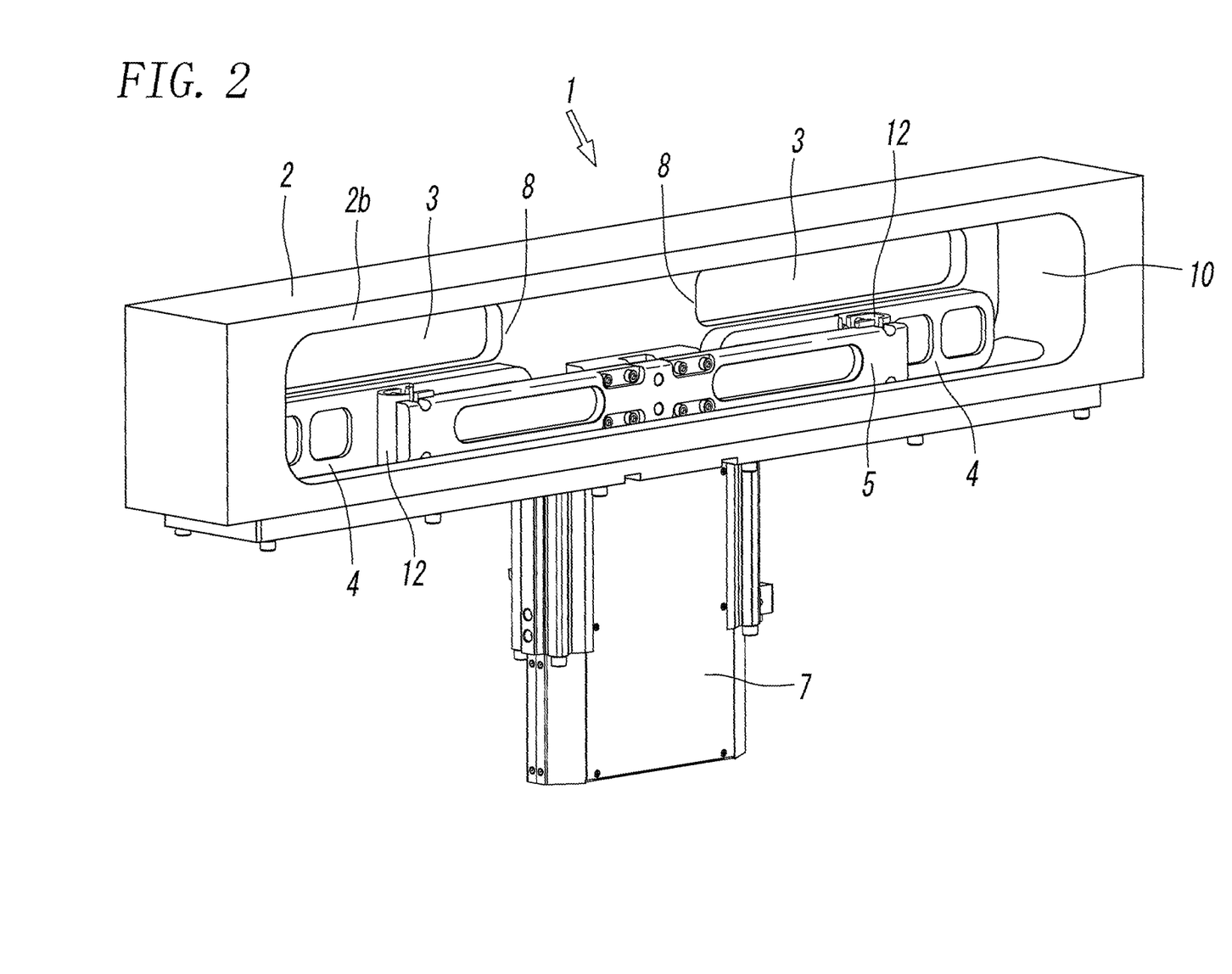
FIG. 2 is a perspective view of the gate valve illustrated in FIG. 1 as viewed from diagonally above and behind.
Figure 3:
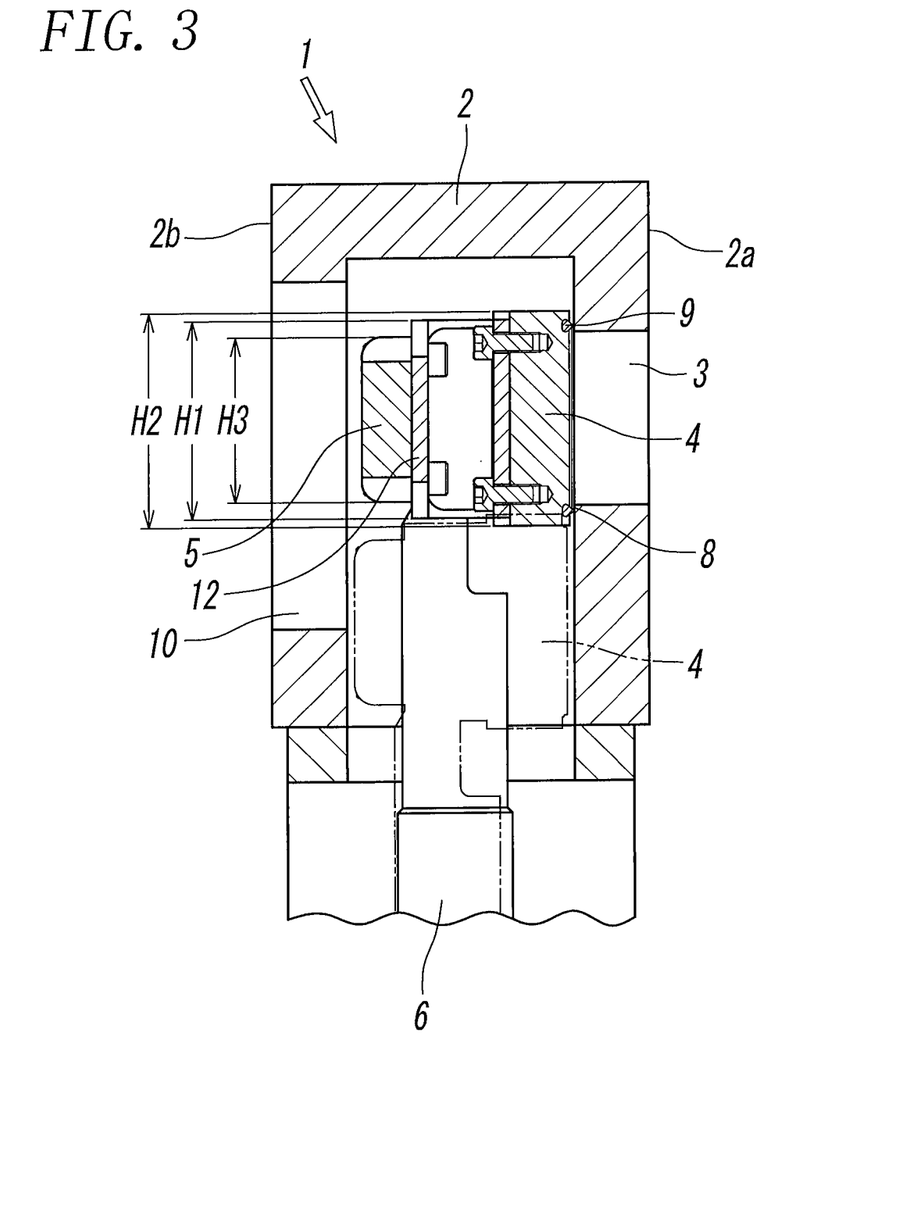
FIG. 3 is a vertical cross-sectional view of a main part of the gate valve illustrated in FIG. 1 cut at the position of one of valve plates.

FIGS. 1 to 11 illustrate a gate valve 1 according to a first embodiment. The gate valve 1 is used by being attached to a vacuum chamber (not illustrated) having two gates. As illustrated in FIGS. 1 to 3, the gate valve 1 includes a valve box 2 having two openings 3, 3 that respectively communicate with two gates of the vacuum chamber, two valve plates 4, 4 that are housed inside of the valve box 2 and that respectively open and close the two openings 3 and 3, and a single support bar 5 that supports the two valve plates 4, 4, a single valve rod 6 connected to the support bar 5, and an operation unit 7 that performs an open/close operation on the two valve plates 4 and 4 via the valve rod 6. As illustrated in FIG. 3, by operating the valve rod 6 with the operation unit 7, the valve plate 4 is moved up and down between a closed position denoted by a solid line at which the opening 3 is closed and a standby position denoted by a dashed line at which the opening 3 is open.

The operation unit 7 is provided with a drive mechanism, such as an air cylinder. Since the configuration and operation performed by the operation unit 7 are well-known, description of the operation unit 7 is not repeated here.

The valve box 2 has a laterally elongated rectangular box shape. The two openings 3, 3 each having a laterally elongated rectangular shape and flat valve seats 8 each surrounding one of the openings 3, 3 are formed in a front wall 2a of the valve box 2. A valve seal 9 attached to each valve plate 4 is pressed against the valve seat 8 at the closed position of the valve plate 4 and, thus, the two openings 3, 3 are closed by the two valve plates 4, 4 at the same time.

The two openings 3, 3 are arranged in parallel with a spacing therebetween in the long direction of the openings 3 (the lateral direction), and the two valve seats 8, 8 around the two openings 3, 3 are located in the same plane.

One window hole 10 having such a size as to surround the two openings 3, 3 is formed in a rear wall 2b of the valve box 2. A semiconductor wafer is carried into the vacuum chamber from the window hole 10, and a semiconductor wafer in the vacuum chamber is carried out from the window hole 10 via the opening 3.

Figure 4:
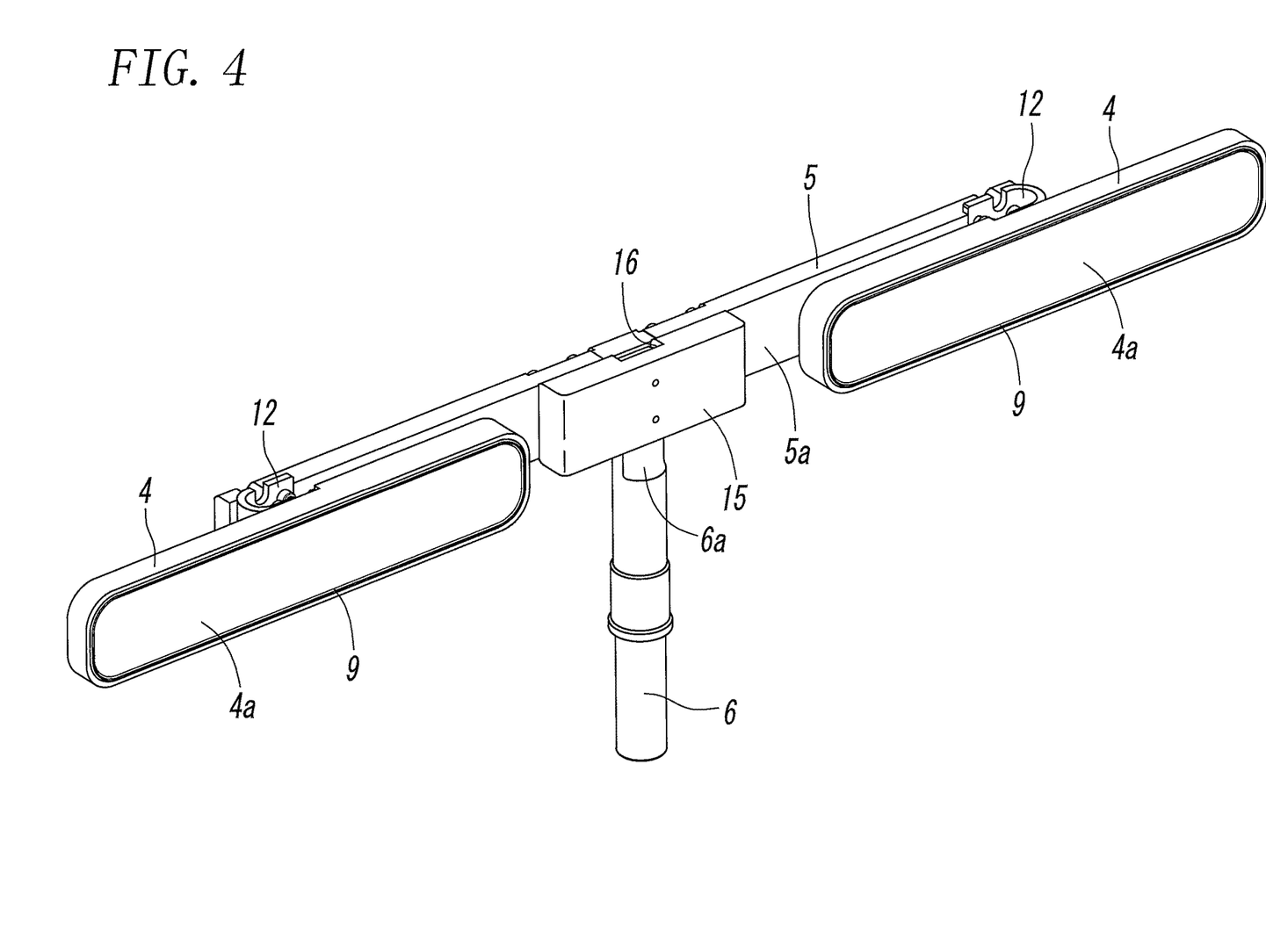
FIG. 4 is a perspective view of the gate valve illustrated in FIG. 1, with a valve box and an operation unit removed.
Figure 5:
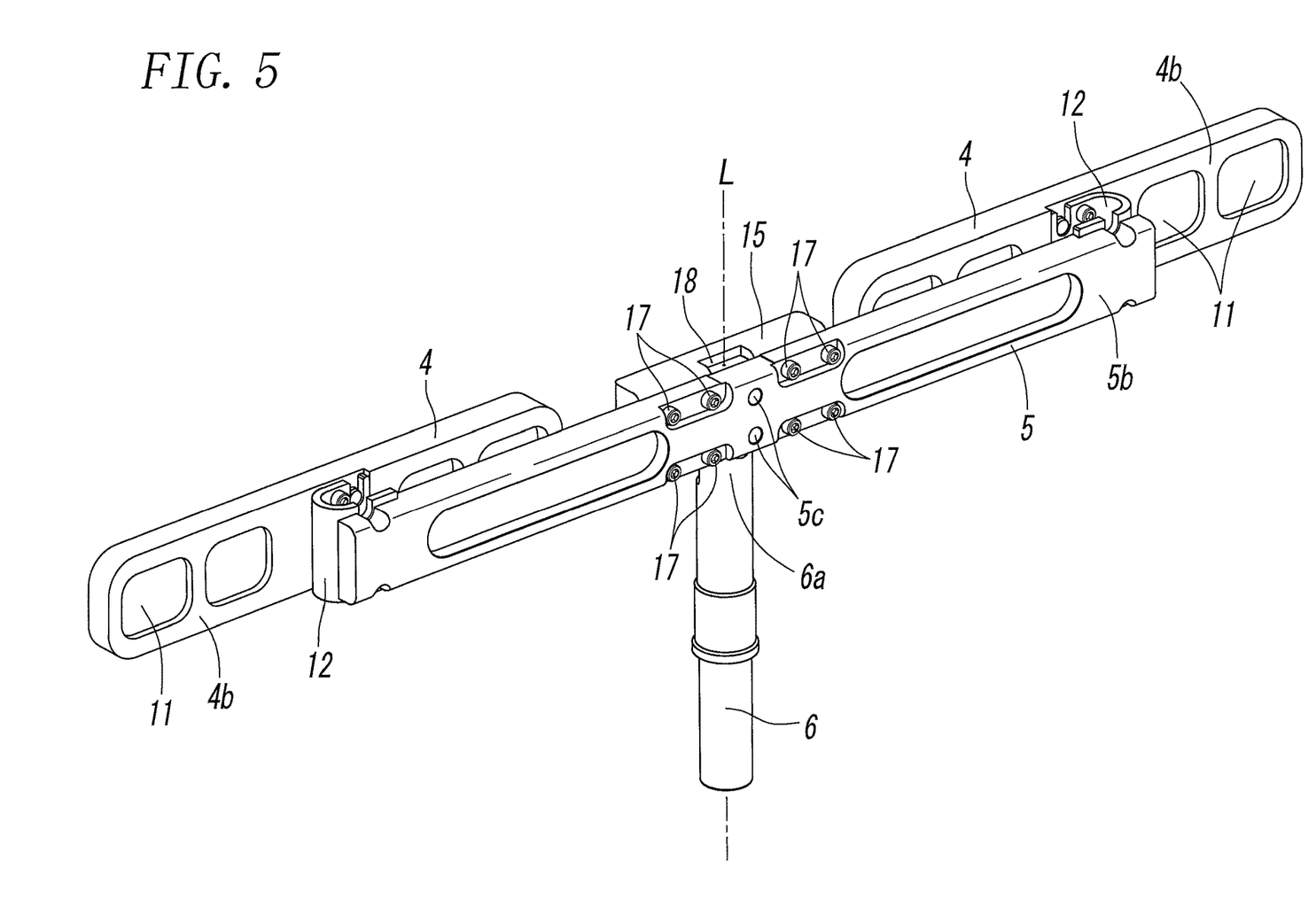
FIG. 5 is a perspective view of the gate valve illustrated in FIG. 4 as viewed from behind.
Figure 6:
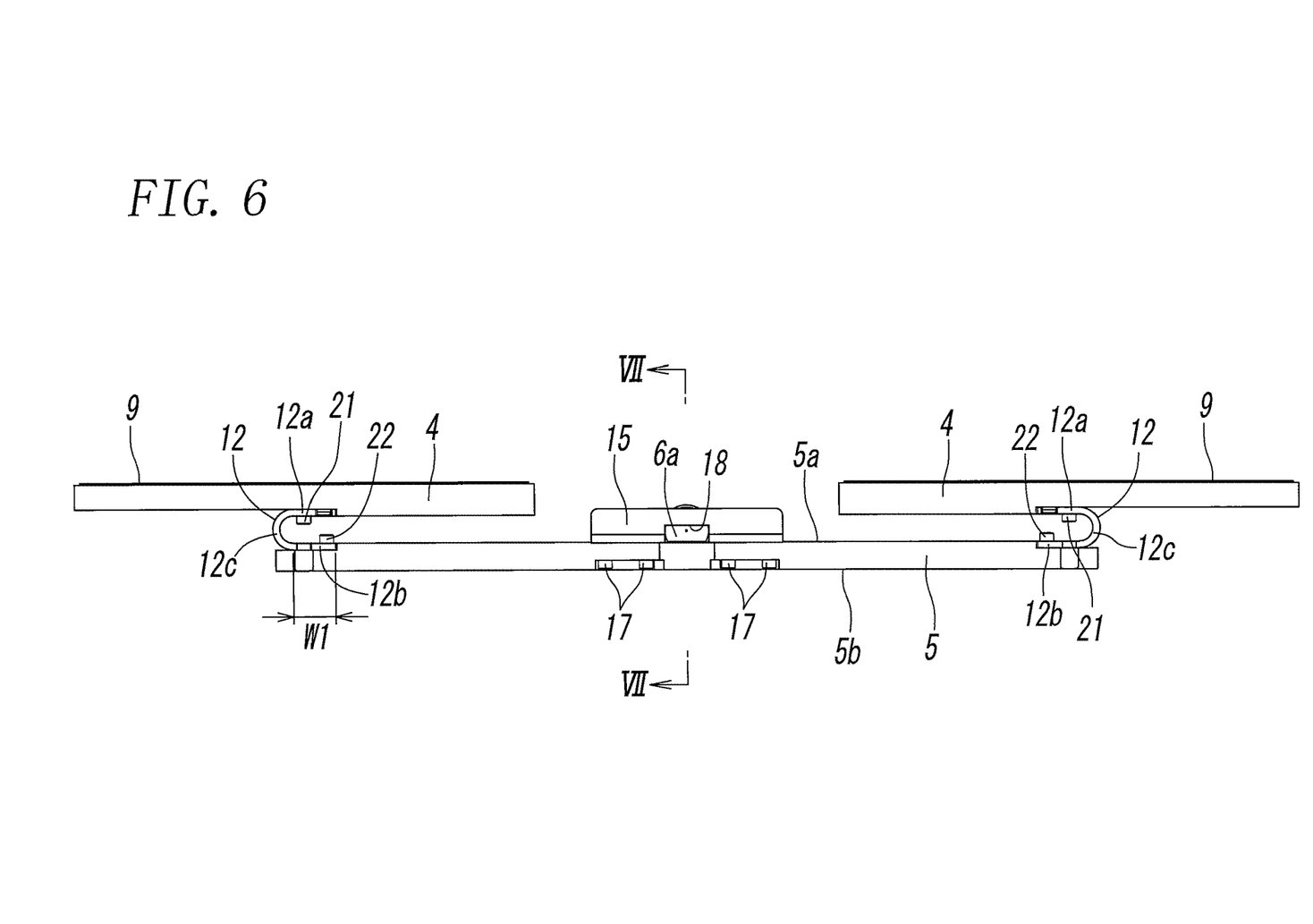
FIG. 6 is a plan view of the gate valve illustrated in FIG. 4.

As can be seen from FIGS. 4 to 6, the valve plate 4 has a laterally elongated rectangular plate shape. The valve plate 4 has a front surface 4a facing the opening 3 and a back surface 4b on the opposite side of the front surface 4a. The valve seal 9 is attached to the front surface 4a, and a plurality of recesses 11 for lightening the weight are provided in the back surface 4b.

In addition, the support bar 5 is also made from a laterally elongated rectangular plate-shaped member and has a front surface 5a having the valve plate 4 attached thereon and a back surface 5b on the opposite side. Then, the upper end portion of the valve rod 6 is connected to the central portion in the long direction of the support bar 5, and one and the other of the two valve plates 4, 4 are attached to one end and the other end in the long direction of the support bar 5 via elastic members 12, respectively, in a tiltable manner in the long direction of the valve plate 4.

Figure 7:
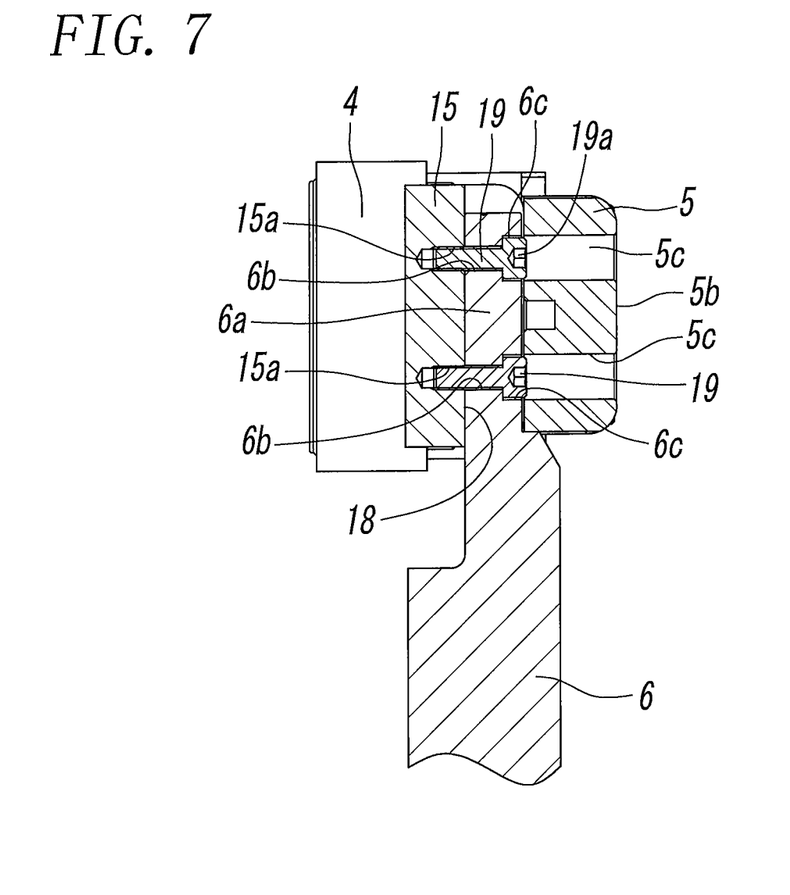
FIG. 7 is an enlarged end elevational view of FIG. 6 taken along a line VII-VII.
Figure 8:
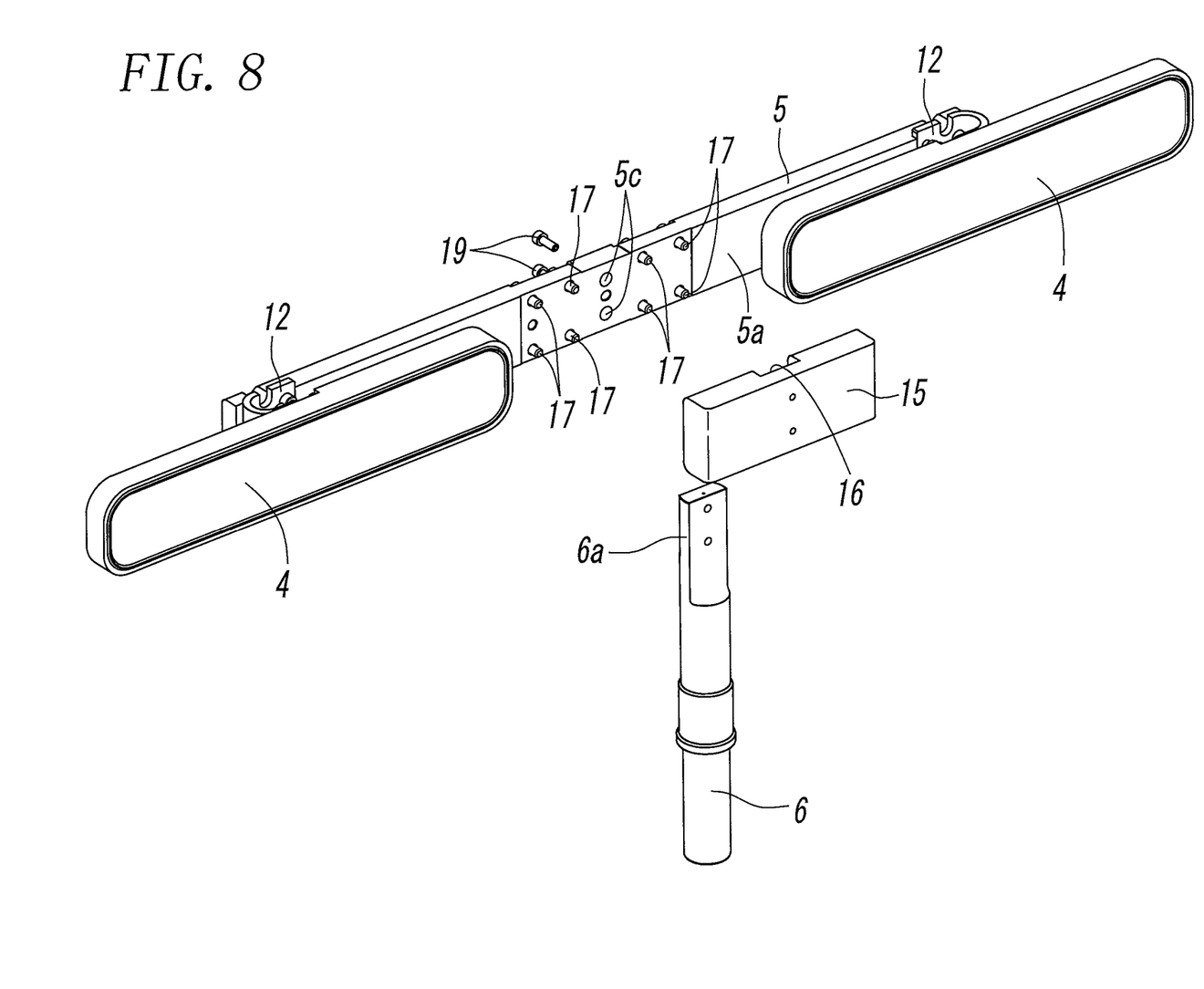
FIG. 8 is an exploded perspective view of a connecting portion between a valve rod and a support bar.
Figure 9:
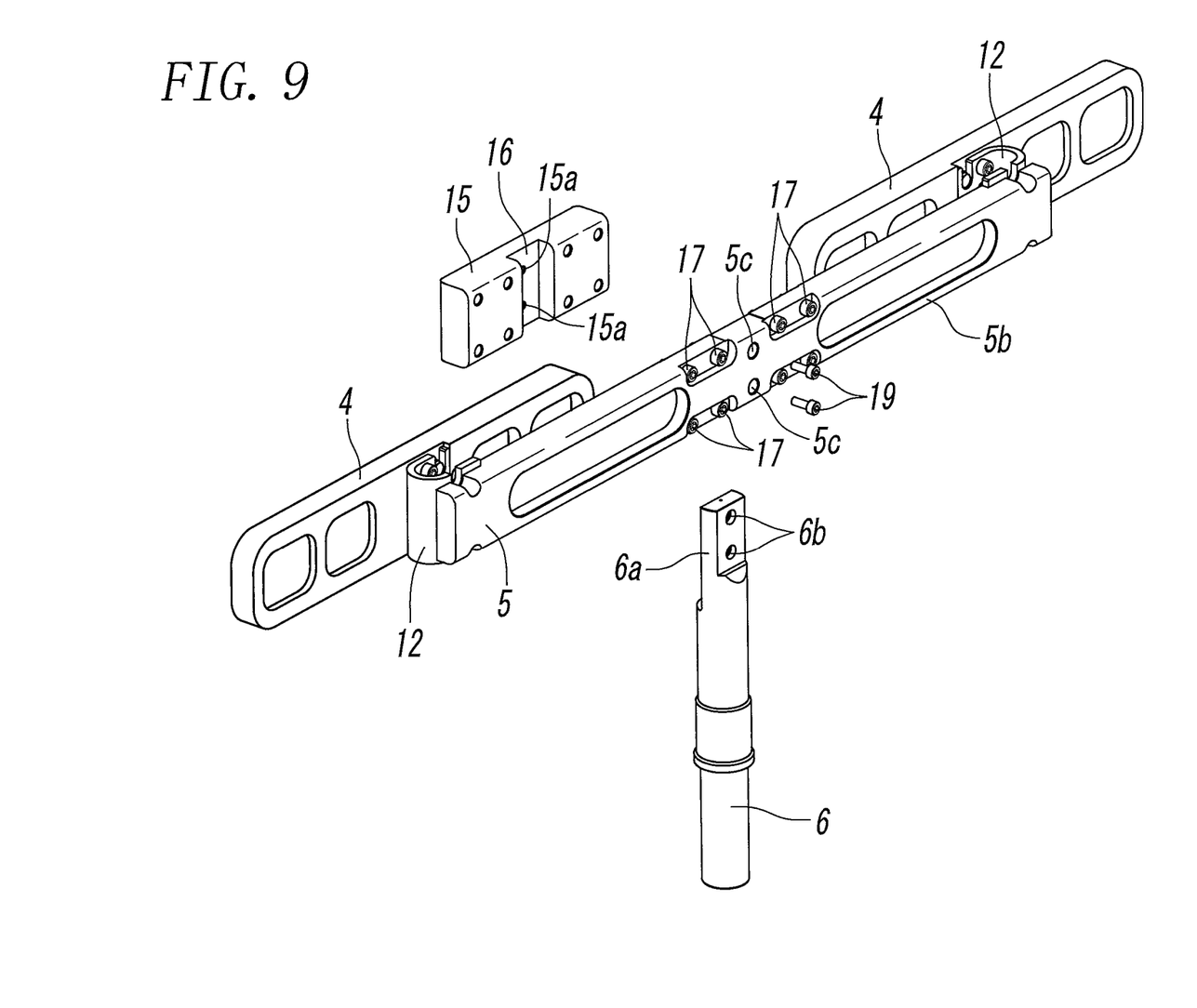
FIG. 9 is a perspective view of FIG. 8 as viewed from behind.

As can be seen from FIGS. 7 to 9, to connect the valve rod 6 to the support bar 5, a rectangular frame plate 15 having a concave groove 16 is fixed to a central portion of the front surface 5a of the support bar 5 using a plurality of (eight in the figures) frame plate fixing screws 17, and a connecting hole 18 having a rectangular cross section is formed between the concave groove 16 of the frame plate 15 and the front surface 5a of the support bar 5 so as to extend in the short direction of the support bar 5 (the vertical direction).

Note that according to the present invention, the screws used for connecting the support bar 5 to the valve rod 6 and connecting the support bar 5 to the valve plate 4 are all hexagon socket head cap screws. A hexagon bar wrench is used as a tool for a screwing operation of the screws.

In addition, part of the front surface and part of the back surface of the tip portion (the upper end portion) of the columnar valve rod 6 are cut off into flat shapes and, thus, a rectangular column shaped connecting portion 6a having a substantially rectangular cross section is formed at the tip portion of the valve rod 6. The connecting portion 6a is inserted into the connecting hole 18 from below the support bar 5. Then, a plurality of (two in the figures) rod connecting screws 19 are screwed from the side adjacent to the back surface 5b of the support bar 5 into a plurality of screw holes 15a formed in the frame plate 15 through a plurality of operation holes 5c formed in the support bar 5 and a plurality of screw insertion holes 6b formed in the connecting portion 6a and, thus, the support bar 5 is connected to the tip of the valve rod 6 so as to extend straight in the lateral direction perpendicular to a central axis L of the valve rod 6 (refer to FIG. 5). At this time, a head portion 19a of each of the rod connecting screws 19 is locked to the valve rod 6 in a counterbore portion 6c formed in the connecting portion 6a.

Since in this manner, the valve rod 6 is connected to the front surface 5a of the support bar 5 to which the valve plate 4 is connected, the frame plate 15, the connecting portion 6a of the valve rod 6, and the like are prevented from protruding toward the back surface 5b of the support bar 5. As a result, the longitudinal width of the entire gate valve 1 including the valve box 2 can be reduced, making the gate valve 1 smaller.

The connection between the support bar 5 and each of the valve plates 4 is described below.

Figure 10:
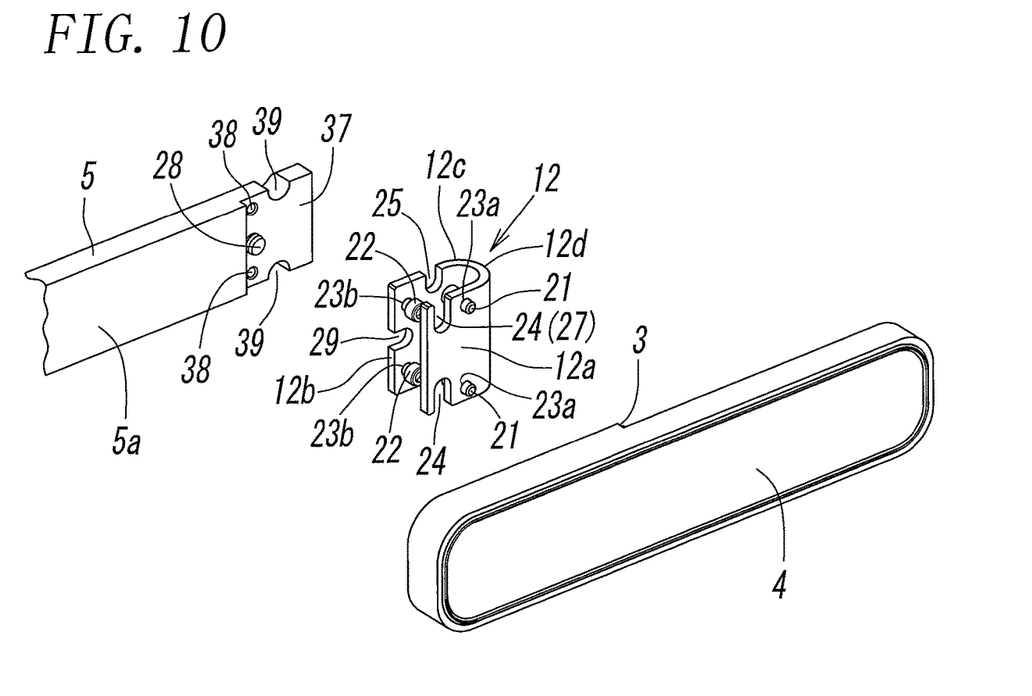
FIG. 10 is an exploded perspective view of a connecting portion between a valve plate and a support bar.
Figure 11:
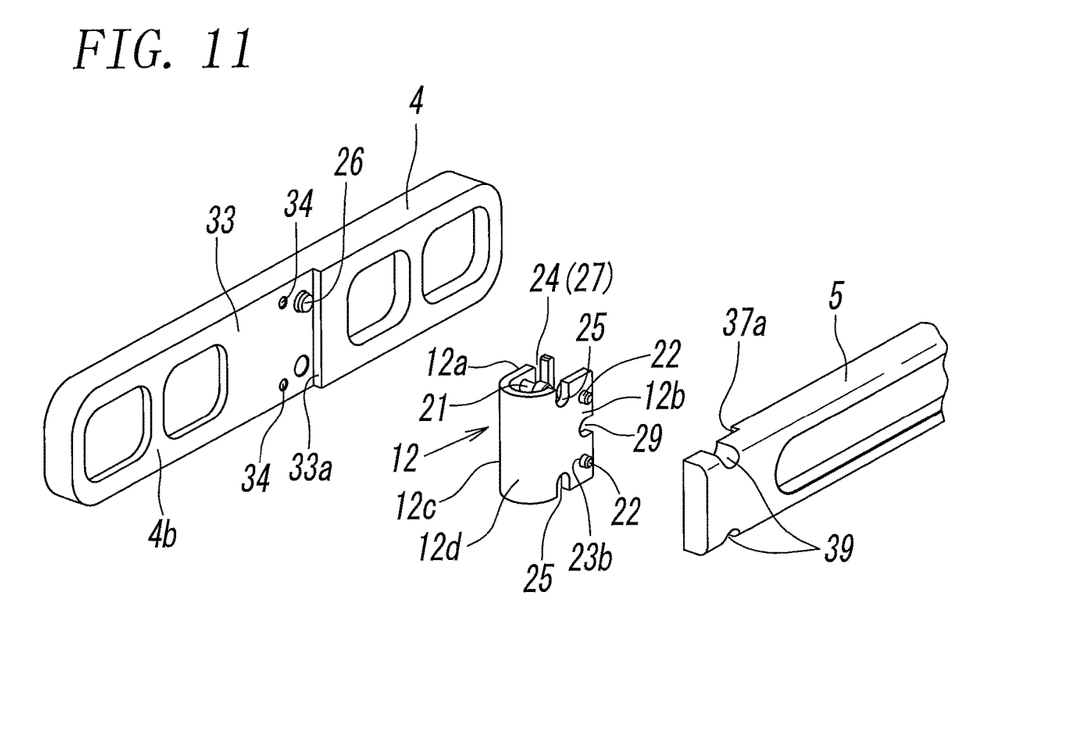
FIG. 11 is a perspective view of FIG. 10 as viewed from behind.

As indicated by the connection between the support bar 5 and one of the valve plates 4 in FIGS. 10 and 11, an elastic member 12 is composed of a leaf spring formed by bending a metal plate having a uniform thickness into a U shape. The elastic member 12 has a first side wall 12a and a second side wall 12b that are parallel to each other and an arc-shaped bent portion 12c that connects one end of the first side wall 12a to one end of the second side wall 12b in the direction of a width W1 (refer to FIG. 6). Then, the elastic member 12 is disposed so as to have a posture in which a convex surface 12d of the bent portion 12c is directed to the outer side in the long direction of the support bar 5 (the direction away from the valve rod 6). The first side wall 12a is connected to the central portion of the back surface 4b of the valve plate 4 by two first screws 21, 21, and the second side wall 12b is connected to an end portion of the front surface 5a of the support bar 5 by two second screws 22, 22.

More specifically, two screw insertion holes 23a that enables the first screws 21 to pass therethrough are formed one above the other in the first side wall 12a of the elastic member 12 at a position closer to the bent portion 12c than the center of the first side wall 12a in the direction of the width W1. In addition, two first notch portions 24 are formed one above the other to oppose each other at a position closer to a free end of the first side wall 12a than the center. The screw insertion hole 23a is a circular hole, and the first notch portion 24 is a vertical groove cut downward or upward from the upper edge or the lower edge of the first side wall 12a to a certain depth.

The first notch portion 24 is for use in inserting the second screw 22 into a screw insertion hole 23b of the second side wall 12b when the second side wall 12b is connected to the support bar 5 by the second screw 22 and is for use in enabling a hexagonal bar wrench for screwing the inserted second screw 22 to pass therethrough.

In addition, in the second side wall 12b of the elastic member 12, the two screw insertion holes 23b for enabling the second screws 22 to pass therethrough are formed one above the other at positions facing the two first notch portions 24, 24 of the first side wall 12a, and two second notch portions 25, 25 are formed at positions facing the two screw insertion holes 23a, 23a of the first side wall 12a. The screw insertion hole 23b is a circular hole, and the second notch portion 25 is a vertical groove cut downward or upward from the upper edge or the lower edge of the second side wall 12b to a certain depth.

The second notch portion 25 is for use in inserting the first screw 21 into the screw insertion hole 23a of the first side wall 12a when the first side wall 12a is connected to the valve plate 4 by the first screw 21 and is for use in enabling a hexagonal bar wrench for screwing the inserted first screw 21 to pass therethrough.

In addition, at the middle position between the two screw insertion holes 23b, 23b in the second side wall 12b, a second positioning groove 29 into which a second positioning pin 28 provided on the support bar 5 is fitted is formed so as to extend laterally from the side edge of the second side wall 12b.

In contrast, in the back surface 4b of the valve plate 4, a stepped down portion 33 is formed in the outer half portion of the back surface 4b in the long direction, and two upper and lower first screw holes 34, 34 are formed at a position close to the inner end of the stepped down portion 33 so as to correspond to the two screw insertion holes 23a, 23a of the first side wall 12a. Furthermore, at a position corresponding to the upper one of the two first notch portions 24, 24 of the first side wall 12a, a columnar first positioning pin 26 is attached.

In addition, a stepped down portion 37 that enables the second side wall 12b of the elastic member 12 to be in contact therewith is formed in an end portion of the front surface 5a of the support bar 5. Two second screw holes 38, 38 for screwing the two second screws 22, 22 are formed one above the other in the stepped down portion 37. In addition, the single second positioning pin 28 is attached at the middle position between the two second screw holes 38, 38. Furthermore, two third notch portions 39, 39 each consisting of a groove having an arc-shaped cross section are formed at one edge (the upper edge) and the other edge (the lower edge) in the short direction of the support bar 5 so as to correspond to the two second notch portions 25, 25 formed in the second side wall 12b, respectively.

Thereafter, the second screw 22 inserted into the screw insertion hole 23b of the second side wall 12b from the inside of the elastic member 12 is screwed into the second screw hole 38 of the support bar 5 using a hexagonal bar wrench with the second side wall 12b of the elastic member 12 in contact with the front surface 5a of the support bar 5, first. Thus, the elastic member 12 is connected to the support bar 5. At this time, the screwing operation of the second screw 22 using the hexagonal bar wrench is performed through the first notch portion 24 formed in the first side wall 12a. In addition, at the same time as the second positioning pin 28 attached to the support bar 5 fits into the second positioning groove 29 of the second side wall 12b, the side end portion of the second side wall 12b is brought into contact with a step wall 37a of the stepped down portion 37. Thus, positioning of the elastic member 12 and the support bar 5 is achieved.

Subsequently, the first side wall 12a of the elastic member 12 is brought into contact with the back surface 4b of the valve plate 4, and the first screw 21, which has been previously inserted into the screw insertion hole 23a of the first side wall 12a from the inside of the elastic member 12, is screwed into the first screw hole 34 of the valve plate 4 with a hexagonal bar wrench. Thus, the valve plate 4 is connected to the elastic member 12. At this time, the screwing operation of the first screw 21 with the hexagonal bar wrench is performed through the third notch portion 39 formed in the support bar 5 and the second notch portion 25 formed in the second side wall 12b. In addition, at the same time as the first positioning pin 26 attached to the valve plate 4 fits into the first notch portion 24 at the upper edge of the first side wall 12a, the side end portion of the first side wall 12a is brought into contact with a step wall 33a of the stepped down portion 33. Thus, positioning of the elastic member 12 and the valve plate 4 is achieved. That is, the first notch portion 24 serves as a first positioning groove 27 into which the first positioning pin 26 is fitted.

In the above-described manner, the two valve plates 4 are attached to either end of the support bar 5. At this time, the convex surfaces 12d of the bent portions 12c of the two elastic members 12, 12 face opposite directions.

In addition, the two elastic members 12, 12 are formed into shapes that are symmetrical to each other with respect to a plane including the central axis L. In the example illustrated in the figures, the two elastic members 12, 12 have the same shape.

Note that the widths W1 of the first side wall 12a and the second side wall 12b are the same diameter. However, the width of the first side wall 12a may be greater than that of the second side wall 12b, or vice versa.

In addition, it is desirable that as illustrated in FIG. 3, a height H1 of the elastic member 12 be equal to or slightly less than a vertical width H2 of the valve plate 4, and a vertical width H3 of the support bar 5 be equal to or slightly smaller than the vertical width H2 of the valve plate 4.

The gate valve 1 having the above-described configuration opens and closes the two gates of the vacuum chamber by mounting the valve box 2 in the vacuum chamber and opening and closing the two openings 3, 3 of the valve box 2 using the two valve plates 4, 4. When the openings 3, 3 of the valve box 2 are closed using the valve plates 4, 4, the valve rod 6 and the valve plates 4, 4 are raised from the position denoted by the dashed line to the position denoted by the solid line by the operation unit 7 (refer to FIG. 1 and FIG. 2), as illustrated in FIG. 3, and the valve seals 9, 9 of the two valve plates 4, 4 are pressed against the valve seats 8, 8 of the two openings 3, 3, respectively, via the support bar 5 at the same time.

At this time, the operating force of the valve rod 6 acts on the central portion of the support bar 5, causing the support bar 5 to bend convexly toward the front surface 5a. For this reason, even if the pressing force of the support bar 5 acts obliquely on the second side wall 12b of the elastic member 12, the bent portion 12c of the elastic member 12 deforms elastically to absorb the force and prevents the force from acting obliquely on the first side wall 12a. Thus, the entire valve plate 4 is evenly pressed against the valve seat 8. As a result, the two valve plates 4, 4 seal the two openings 3, 3 evenly at all times.

In addition, since there are no parts rubbing against each other between the support bar 5 and the elastic member 12 and between the elastic member 12 and the valve plate 4, dust is less likely to be generated.

When the valve plate 4 is removed from the valve box 2 for maintenance, inspection, or the like of the gate valve 1, 1B, a hexagonal bar wrench is inserted into the valve box 2 through the window hole 10 in the back surface of the valve box 2 to remove the two first screws 21, 21 connecting the first side wall 12a of the elastic member 12 to the valve plate 4 from the side adjacent the back surface 5b of the support bar 5. Thereafter, the valve plate 4 is lifted upward so that the first positioning pin 26 comes out upward from the first positioning groove 27 (the first notch portion 24). Thus, the valve plate 4 is completely separated from the elastic member 12. In this manner, the valve plate 4 can be taken out of the valve box 2 through the window hole 10. If a window hole is provided in the top side of the valve box 2, the valve plate 4 can be taken out from the top side.

In the example illustrated in the figures, one first positioning pin 26 and one second positioning pin 28 are provided. However, a plurality of first positioning pins 26 and a plurality of second positioning pins 28 may be provided. In this case, a plurality of first positioning grooves 27 and a plurality of second positioning grooves 29 are also provided.

Alternatively, the first positioning pin 26 may be provided on the elastic member 12, and the first positioning groove 27 may be provided in the valve plate 4. Similarly, the second positioning pin 28 may be provided on the elastic member 12, and the second positioning groove 29 may be provided in the support bar 5.

Figure 12:
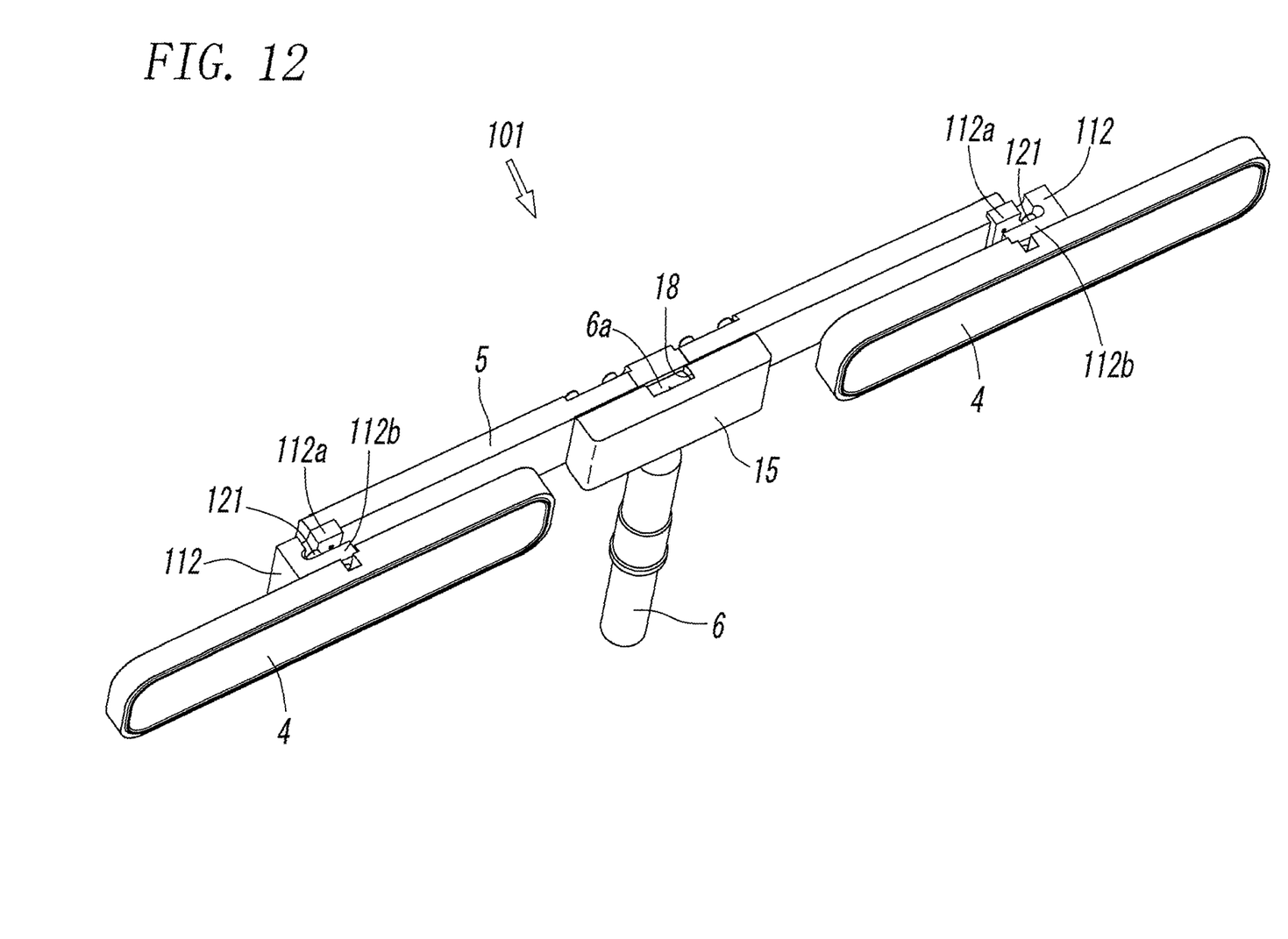
FIG. 12 is a perspective view of a gate valve with a valve box and an operation unit removed, according to a second embodiment.
Figure 13:
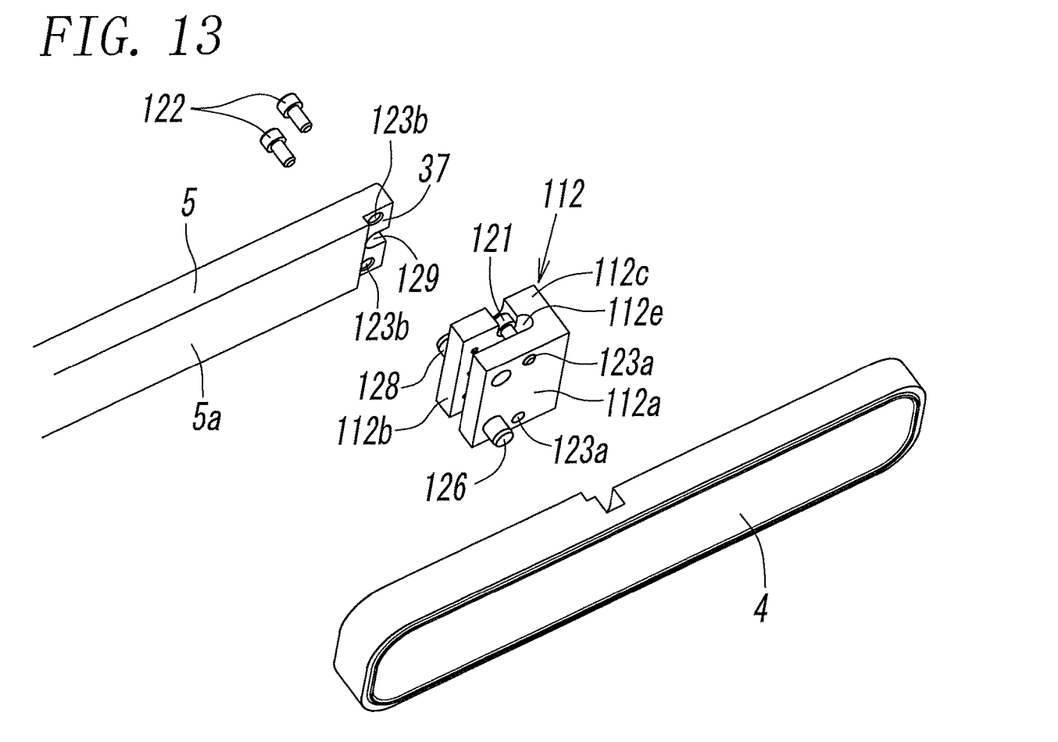
FIG. 13 is an enlarged perspective view of a main part of the gate valve in which part of the gate valve illustrated in FIG. 12 is exploded.
Figure 14:
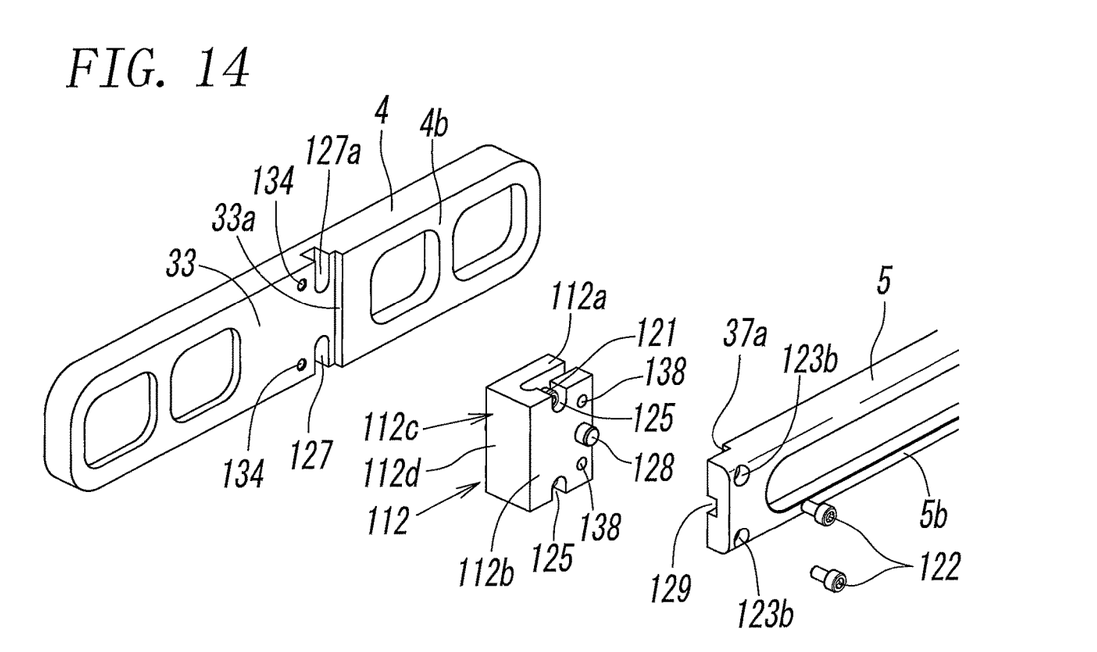
FIG. 14 is a perspective view of FIG. 13 as viewed from behind.

FIGS. 12 to 14 illustrate a gate valve 101 according to a second embodiment with the valve box removed. The difference between the gate valve 101 and the gate valve 1 according to the first embodiment described above resides in the configuration of an elastic member 112 and the configuration related to the connection between the support bar 5 and the valve plate 4 by the elastic member 112. The other configuration is the same as that of the gate valve 1 according to the first embodiment described above. For this reason, the configuration that differs from that of the first embodiment is described below. In the other configuration, the same reference numerals are used for identical major constituent elements as those used in the gate valve 1 according to the first embodiment, and the description is not repeated.

The thickness of the elastic member 112 is greater than that of the elastic member 12 according to the first embodiment, and a convex surface 112d of a bent portion 112c forms a plane that is connected at right angles to the lateral surfaces of the first side wall 112a and the second side wall 112b. However, an inner concave surface 112e of the bent portion 112c has an arc shape.

In the first side wall 112a, two screw insertion holes 123a that allows first screws 121 to pass therethrough are formed one above the other at a position closer to the bent portion 112c than the center in the width direction of the first side wall 112a. In addition, a first positioning pin 126 is provided in the lower end portion at a position closer to the free edge of the first side wall 112a than the center.

In addition, in the second side wall 112b of the elastic member 112, two upper and lower second notch portions 125, 125 each formed as a vertical groove are formed at positions facing the two screw insertion holes 123a, 123a of the first side wall 112a. Furthermore, two upper and lower second screw holes 138, 138 are formed at positions closer to the free edge than the center in the width direction of the second side wall 112b. Still furthermore, a second positioning pin 128 is provided at the middle position between the two second screw holes 138, 138.

In contrast, in the back surface 4b of the valve plate 4, two upper and lower first screw holes 134, 134 are formed at a position close to the inner end of the stepped down portion 33 formed in the outer half of the back surface 4b in the long direction so as to correspond to the two screw insertion holes 123a, 123a of the first side wall 112a. In addition, a first positioning groove 127 with which the first positioning pin 126 on the first side wall 112a is engaged is formed at a position close to the lower end portion of the valve plate 4. The first positioning groove 127 is cut upward from the lower end of the valve plate 4 to a certain depth, but does not penetrate the valve plate 4 in the longitudinal direction (the thickness direction).

In addition, a stepped down portion 37 is formed at the end of the front surface 5a of the support bar 5 so as to be in contact with the second side wall 112b of the elastic member 112, and two upper and lower screw insertion holes 123b, 123b are formed in the stepped down portion 37 so as to correspond to the two second screw holes 138, 138 provided in the second side wall 112b of the elastic member 112. In addition, a second positioning groove 129 with which the second positioning pin 128 is to be engaged is formed at a middle position between the two screw insertion holes 123b, 123b.

The horizontal width of the stepped down portion 37 is less than the horizontal width of the second side wall 112b and has such a size as to be in contact with only a half of the second side wall 112b adjacent to the free edge, and does not reach the second notch portion 125.

In addition, the second positioning groove 129 consists of a lateral groove that is cut in the front surface 5a of the support bar 5 laterally from the side end of the support bar 5 to a certain depth, and does not penetrate the support bar 5 into the back surface 5b.

Thereafter, the first side wall 112a of the elastic member 112 is brought into contact with the back surface 4b of the valve plate 4, and the first screw 121, which has been previously inserted into the screw insertion hole 123a of the first side wall 112a from the inside of the elastic member 112, is screwed into the first screw hole 134 of the valve plate 4 using a hexagonal bar wrench. Thus, the valve plate 4 is connected to the elastic member 112. The screwing operation of the first screw 121 using the hexagonal bar wrench is performed through the second notch portion 125 formed in the second side wall 112b. In addition, the first positioning pin 126 provided on the lower end portion of the first side wall 112a is engaged with the first positioning groove 127 formed on the lower end portion of the valve plate 4, and the side end portion of the first side wall 112a is brought into contact with the step wall 33a of the stepped down portion 33. In this manner, positioning of the elastic member 112 and the valve plate 4 are achieved.

Note that in the example illustrated in the figures, a vertical groove 127a similar to the first positioning groove 127 is formed in the upper end portion of the back surface 4b of the valve plate 4 so as to extend downward. However, the vertical groove 127a has no special function.

Subsequently, a second screw 122 is screwed from the side adjacent to the back surface 5b of the support bar 5 into the second screw hole 138 of the second side wall 112b through the screw insertion hole 123b of the support bar 5 with the second side wall 112b of the elastic member 112 in contact with the front surface of the stepped down portion 37 of the support bar 5. Thus, the elastic member 112 is connected to the support bar 5. At this time, the second positioning pin 128 on the second side wall 112b fits into the second positioning groove 129 of the support bar 5, and the side end portion of the second side wall 112b is brought into contact with the step wall 37a of the stepped down portion 37. In this manner, positioning of the elastic member 112 and the support bar 5 is achieved.

The order of connecting the support bar 5 to the valve plate 4 via the elastic member 112 may be reversed from that described above. After the elastic member 112 is attached to the support bar 5, the valve plate 4 can be attached to the elastic member 112.

Since the action of the gate valve 101 according to the second embodiment is the same as that of the gate valve 1 according to the first embodiment, description of the action is not repeated to avoid redundancy.

In addition, when the valve plate 4 is removed for maintenance, inspection, or the like of the gate valve 101, the two first screws 121, 121 connecting the first side wall 112a of the elastic member 112 to the valve plate 4 are removed from the side adjacent to the back surface 5b of the support bar 5 by using a hexagonal bar wrench and, thereafter, the valve plate 4 is lifted upward. Thus, the first positioning groove 127 of the valve plate 4 can be removed from the first positioning pin 126 of the elastic member 112. In this manner, the valve plate 4 can be removed independently.

In contrast, to remove the valve plate 4 together with the elastic member 112 with the valve plate 4 being connected to the elastic member 112, the second screw 122 is removed by using a hexagonal bar wrench and, thereafter, the valve plate 4 and the elastic member 112 are laterally moved together. Thus, the second positioning pin 128 of the elastic member 112 comes out of the second positioning groove 129 of the support bar 5. As a result, the valve plate 4 and the elastic member 112 can be removed as a single unit.

REFERENCE SIGNS LIST 1, 101 gate valve
2 valve box
3 opening
4 valve plate
4b back surface
5 support bar
5a front surface
5b back surface
6 valve rod
7 operation unit
12, 112 elastic member
12a, 112a first side wall
12b, 112b second side wall
12c, 112c bent portion
12d, 112d convex surface
21, 121 first screw
22, 122 second screw
23a, 123a screw insertion hole
23b, 123b screw insertion hole
24 first notch portion
25, 125 second notch portion
26, 126 first positioning pin
27, 127 first positioning groove
28, 128 second positioning pin
29, 129 second positioning groove
34, 134 first screw hole
38, 138 second screw hole
L central axis
H1 height
H2, H3 vertical width

The invention claimed is:

1. A dual gate valve comprising:
two valve plates that open and close two openings of a valve box;
a support bar that supports the two valve plates;
a valve rod connected to the support bar; and
an operation unit that performs an open and close operation of the two valve plates via the valve rod,
wherein the support bar and the valve plate linearly and elongatedly extend in a lateral direction perpendicular to a central axis of the valve rod, the valve rod is connected to a central portion in a longitudinal direction of the support bar the two valve plates are attached on a front surface of the support bar, and one and the other of the two valve plates are tiltably attached to one end and the other end of the support bar in the longitudinal direction via elastic members, respectively.

2. The dual gate valve according to claim 1, wherein the elastic member has a first side wall and a second side wall parallel to each other and a bent portion that connects one end in a horizontal width direction of the first side wall to one end in the horizontal width direction of the second side wall, the elastic member is disposed such that a convex surface of the bent portion faces an outer side of the support bar in the longitudinal direction, the first side wall is connected to a central portion of a back surface of the valve plate, and the second side wall is connected to an end portion of the front surface of the support bar.

3. The dual gate valve according to claim 2, wherein the first side wall of the elastic member is connected to a back surface of the valve plate using a plurality of first screws screwed from the side adjacent to the second side wall into first screw holes of the valve plate through screw insertion holes of the first side wall, and wherein a plurality of second notch portions into which a tool used at a time of screwing the first screws is fitted are formed in the second side wall at positions facing the first screws.

4. The dual gate valve according to claim 3, wherein the second side wall of the elastic member is connected to a front surface of the support bar using a plurality of second screws screwed from the side adjacent to the first side wall into second screw holes of the support bar through screw insertion holes of the second side wall, and wherein a plurality of first notch portions into which a tool used at the time of screwing the second screws is fitted are formed in the first side wall at positions facing the second screws.

5. The dual gate valve according to claim 3, wherein the second side wall of the elastic member is connected to the front surface of the support bar using a plurality of second screws screwed from the side adjacent the back surface of the support bar into second screw holes of the second side wall through screw insertion holes of the support bar.

6. The dual gate valve according to claim 2, wherein at least one first positioning pin is provided on one of the first side wall of the elastic member and the valve plate, at least one first positioning groove is provided on the other, and the first positioning pin is fitted into the first positioning groove so that positioning of the elastic member and the valve plate is achieved, and wherein at least one second positioning pin is provided on one of the second side wall of the elastic member and the support bar, at least one second positioning groove is provided on the other, and the second positioning pin is fitted into the second positioning groove so that positioning of the elastic member and the support bar is achieved.

7. The dual gate valve according to claim 6, wherein the first positioning pin is provided at a position close to an upper edge portion of the back surface of the valve plate, and wherein the first positioning groove consists of a vertical groove cut in the first side wall from the upper edge downward to a certain depth.

8. The dual gate valve according to claim 6, wherein the first positioning pin is provided at a position close to the lower edge of the first side wall, and wherein the first positioning groove consists of a vertical groove cut in the valve plate from the lower edge upward to a certain depth.

9. The dual gate valve according to claim 6, wherein the second positioning pin is provided at one of a middle position in a height direction of the second side wall and a middle position in a vertical direction of the front surface of the support bar, and wherein the second positioning groove consists of a lateral groove cut at one of a middle position in the vertical direction of the front surface of the support bar and a middle position in the height direction of the second side wall, from one of a side edge portion of the support bar and a side edge portion of the second side wall into a certain depth in the lateral direction.

10. The dual gate valve according to claim 1, wherein the valve rod is connected to the front surface of the support bar.

11. The dual gate valve according to claim 1, wherein a height of the elastic member is equal to or less than a vertical width of the valve plate, and a vertical width of the support bar is equal to or less than the vertical width of the valve plate.

* * * * *